Jan. 1, 1963  E. FANWICK  3,070,860
WELDING TOOL COMPRISING MOLD BLOCKS AND DETACHABLE HANDLES
Filed March 11, 1960
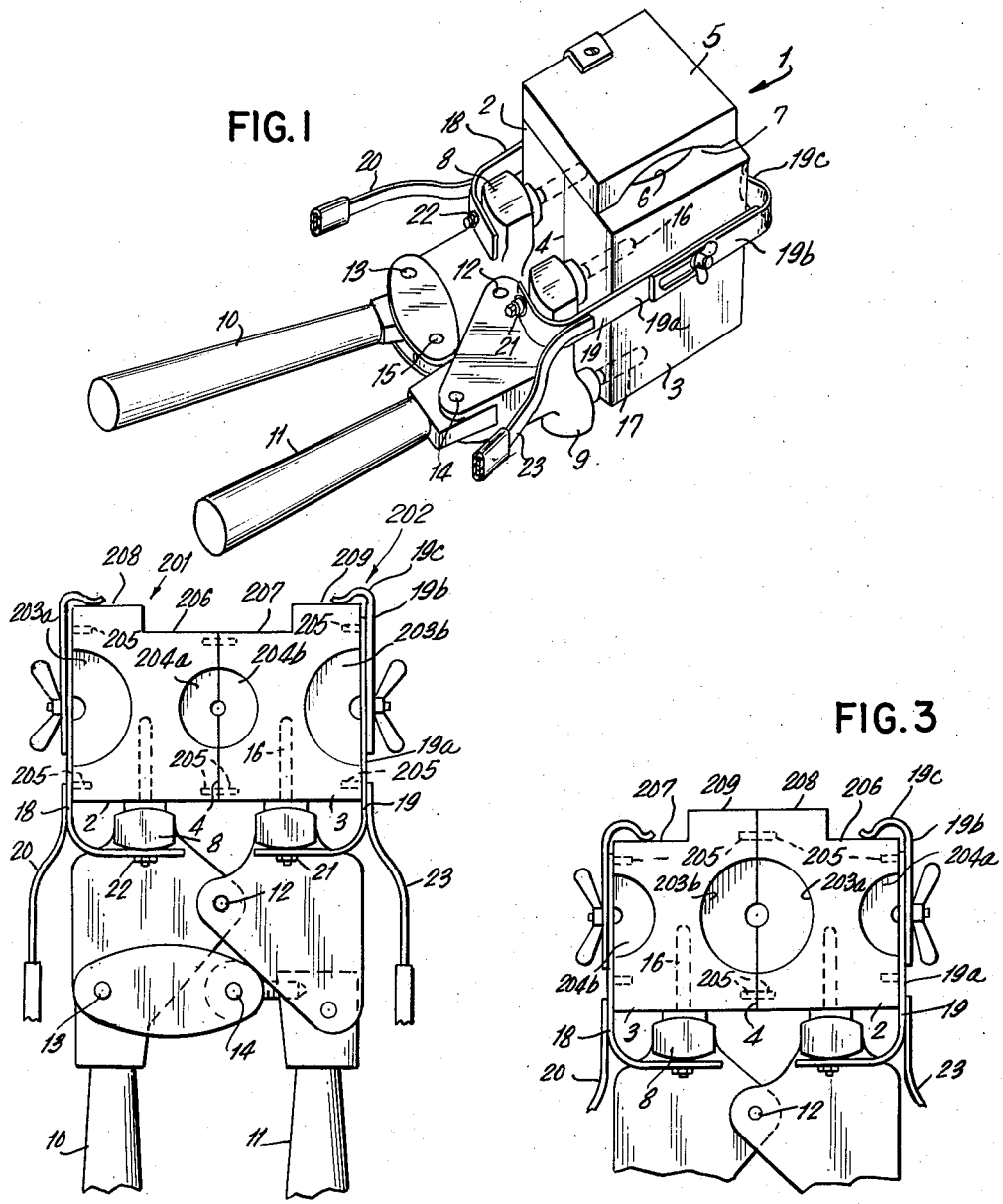
FIG. 1
FIG. 2
FIG. 3
INVENTOR.
ERNEST FANWICK
BY
AGENT ated Jan. 1, 1963

3,070,860
WELDING TOOL COMPRISING MOLD BLOCKS AND DETACHABLE HANDLES

Ernest Fanwick, Stamford, Conn., assignor to Burndy Corporation, a corporation of New York
Filed Mar. 11, 1960, Ser. No. 14,308
8 Claims. (Cl. 22—153)

This invention relates to welding apparatus, and more particularly to cast welding apparatus for use with a mixture which undergoes an exothermic reaction to yield a molten metal.

The mixture, which may conventionally contain copper oxide and a crushed copper-aluminum alloy, is customarily contained in a mold having a substantially hour-glass shaped cavity in a graphite block. Upon ignition of the mixture, molten copper flows into the lower portion of the cavity, wherein the structures to be welded are also contained. The graphite block is generally in two parts, with a parting plane which includes the long axis of the hour-glass, whereby the welded structures may be conveniently removed and the cavity prepared for the next welding operation. A different mold must be used for each type and size of structure to be welded. This necessitates a large inventory of molds for the various structures which may have to be welded.

Handles are customarily supplied to support the graphite blocks. The graphite, unfortunately, is rather fragile, and in repetitive use wears out quite rapidly. To achieve maximum economy the handles are frequently used with replaceable graphite blocks. Some of these handles require the manual operation of thumb screws, or other clamping devices, to secure the handles to the graphite blocks. Due to the temperature of the handles and blocks after use, this frequently becomes inconvenient.

It is, therefore, an object of this invention, to provide a pair of handles which may be conveniently snapped onto graphite blocks for cast welding without any operations requiring manual dexterity.

Another object of this invention is to provide a pair of handles which will accommodate mold blocks of different dimensions.

Still another object of this invention is to provide a pair of mold blocks which contain cavities which are adapted to form two different molds.

A feature of this invention is a pair of handles for cast welding graphite blocks including adjustable spring arms adapted to secure said handles to said blocks.

Another feature of this invention is a pair of blocks containing two different sets of cavities, said blocks having two alternative parting planes, and adapted to form thereby two different molds.

These and other objects and features of this invention will become more apparent by reference to the following description taking in conjunction with the accompanying drawings, in which:

FIG. 1 illustrates in perspective view, cast welding apparatus utilizing a pair of handles embodying the principles of this invention;

FIG. 2 illustrates, in top view, a pair of mold blocks held in one relationship by the handles of FIG. 1, and forming one mold; and FIG. 3 illustrates, in top view, the pair of mold blocks of FIG. 2 in an alternative relationship and forming an alternative mold.

In FIGURE 1, reference character 1 indicates generally a graphite mold comprising two half blocks 2 and 3 with a parting plane 4. A hinged graphite cover 5 caps the cavity 6 while allowing the free exhaust of gas through recess 7.

The graphite mold is mounted on a pair of supports 8 and 9. The supports include at one end a pair of handles 10 and 11; the supports are pivoted to each other at 12 and to the handles at 13 and 14. Handles 10 and 11 are pivoted to each other at 15 and from a toggle arrangement which locks the two half blocks 2 and 3 together.

Supports 8 and 9 each include a pair of pins, as at 16 and 17, which are inserted into mating holes in blocks 2 and 3. Spring arms 18 and 19 are mounted on supports 8 and 9 by bolts 21 and 22. Spring arms 18 and 19 are adjustable in length, so as to fit different sizes of molds, and each includes two strap portions, as at 19a and 19b, connected by suitable means, such as a slot and thumb screw. The free ends of the spring arms terminate in an elbow portion, as at 19c, to grasp the support-remote face of the mold and to retain the mold on pins 16 and 17. The spring arms also have attached thereto rigid arms 20 and 23 which are adapted to swing the spring arms away from the molds to permit mold replacement.

Referring now to FIG. 2, a mold is shown consisting of two base sections 201 and 202. Each section includes two halves of two different cavities, e.g. 203a, 203b, 204a and 204b. Thus depending on how the sections are relatively orientated, two different cavities may be utilized. Holes 205 are disposed in each section to accept locating pins to accurately align the mold sections. If a cover is used, holes 205 may also be used to attach the cover to the mold. Holes 205 are disposed in a central vertical plane to accept the handle pins 16 and 17. To minimize the weight and volume of the mold sections, the surplus mold material may be removed from the handle remote faces, as at 206 and 207. Spring arms 18 and 19 may be adjusted in length to grasp the mold at its reduced 206 and 207 length, or at its full size 208 and 209 length.

FIG. 3 shows base sections 201 and 202 in their alternative relationship. Cavities 203a and 203b are adjacent to each other and thereby form the alternative operational mold.

The invention has thus been described but it is desired to be understood that it is not confined to the particular forms or usages shown and described. The same being merely illustrative, and that the invention may be carried out in other ways without departing from the spirit of the invention, and therefore, the right is broadly claimed to employ all instrumentalities coming within the scope of the appendent claims, and by means of which objects of this invention are attained and new results accomplished, as it is obvious that the particular embodiments herein shown and described are only some of the many that can be employed to obtain these objects and accomplish these results.

I claim:

1. A tool for use with mold sections, comprising: a pair of support members for the mold sections; a plurality of projections mounted on said support members, and adapted to be received by corresponding holes in the mold sections; and a plurality of arms mounted on said support members, adapted to grasp the mold sections at their support remote faces and to secure the mold sections on said projections, said arms each have mounted thereon a rigid elongate element, said element being manually operable to cantilever said arm about said support member and away from said support remote mold section face.

2. A mold assembly comprising two mold halves; each mold half having a plurality of faces which are adapted to be placed into abutment with a mating face on the other mold half; each of said plurality of faces on each mold half including a cavity therein constituting one part of a two part mold cavity, the other part being a cavity on the mating face of said other mold half; and means to assemble said mold halves with two mating surfaces in abutment with their included cavities together forming a complete mold cavity; including a pair of support members for said mold halves; a plurality of projections mounted on said support members, and adapted to be received by corresponding holes in said mold halves; and a plurality of spring biased arms mounted on said support members, adapted to grasp said mold halves at their support remote faces and to secure said mold halves on said projections.

3. An assembly according to claim 2 wherein said arms are adjustable in length.

4. An assembly according to claim 2 wherein said arms each have mounted thereon a rigid elongate element, said element being manually operable to cantilever said arm about said support member and away from said support remote mold half face.

5. An assembly according to claim 4 wherein said means to assemble said mold halves further includes a pair of pivoted together handles; one of each of said support members, projections and said arms being attached to each of said handles, having a mode of operation such that the pivoting of the handles together and apart brings the two mold halves together and apart.

6. An assembly according to claim 5 wherein each of said arms is spring biased towards its mold engaging position.

7. A tool adapted for use with a plurality of mold sections in a cast welding process utilizing an exothermic metal producing reaction, each mold section having an external general front face and an external general rear face, the front face having a recess therein, comprising: a support member for each mold section pivotally interconnected; a projection mounted on each of said support members, and adapted to be received by the recess in the mold section front face; and a stop means mounted on each of said support members and engaging the mold section rear face, said stop means including an arm pivotally mounted on said support member and having a portion extending externally around a side of the mold section to engage the rear face of the mold section, each of said arms including a manually operable portion adapted to pivot said arm engaging portion away from said rear mold section face.

8. A tool according to claim 7 wherein said arm is spring biased to its rear mold section engaging position.

References Cited in the file of this patent

UNITED STATES PATENTS

| | | |
|---|---|---|
| 1,282,210 | Fromm | Oct. 22, 1918 |
| 1,752,040 | Traut | Mar. 25, 1930 |
| 2,360,758 | Cadwell | Oct. 17, 1944 |
| 2,409,142 | McCoy | Oct. 8, 1946 |
| 2,632,216 | McQaid | Mar. 24, 1953 |
| 2,654,129 | Neff | Oct. 6, 1953 |
| 2,789,330 | Brown | Apr. 30, 1957 |
| 2,904,862 | Burke | Sept. 22, 1959 |